Nov. 27, 1934.   D. G. MACKENZIE   1,982,316
MOTOR CAR OR LIKE VEHICLE
Filed Feb. 6, 1931   4 Sheets-Sheet 2
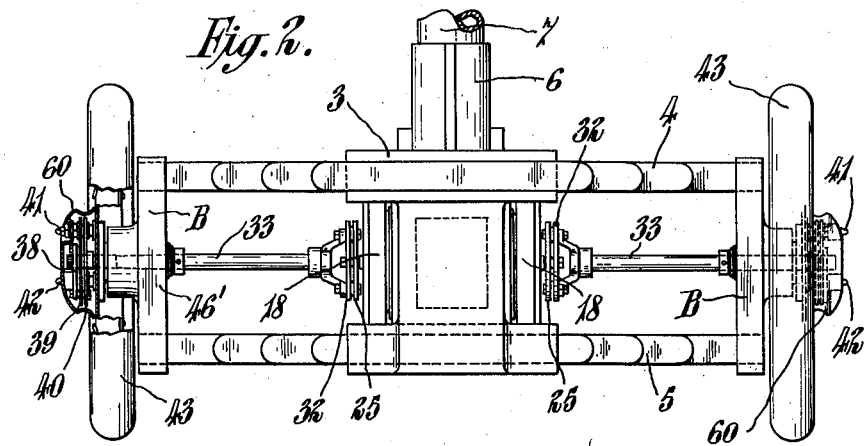

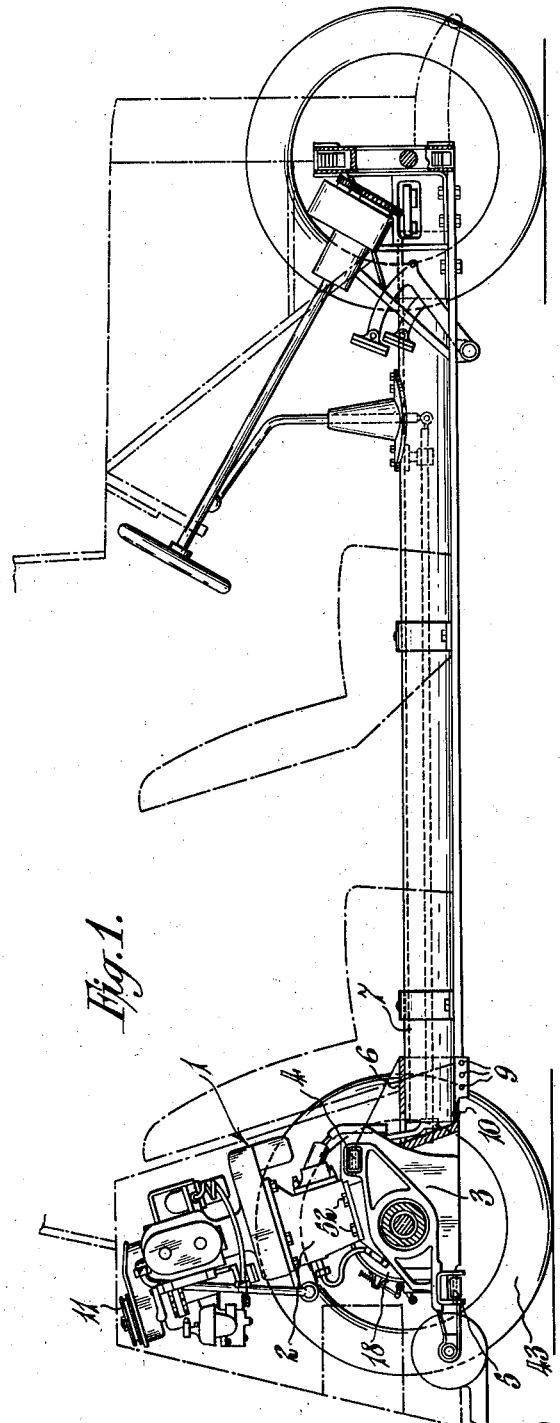

Nov. 27, 1934.  D. G. MACKENZIE  1,982,316
MOTOR CAR OR LIKE VEHICLE
Filed Feb. 6, 1931  4 Sheets-Sheet 3
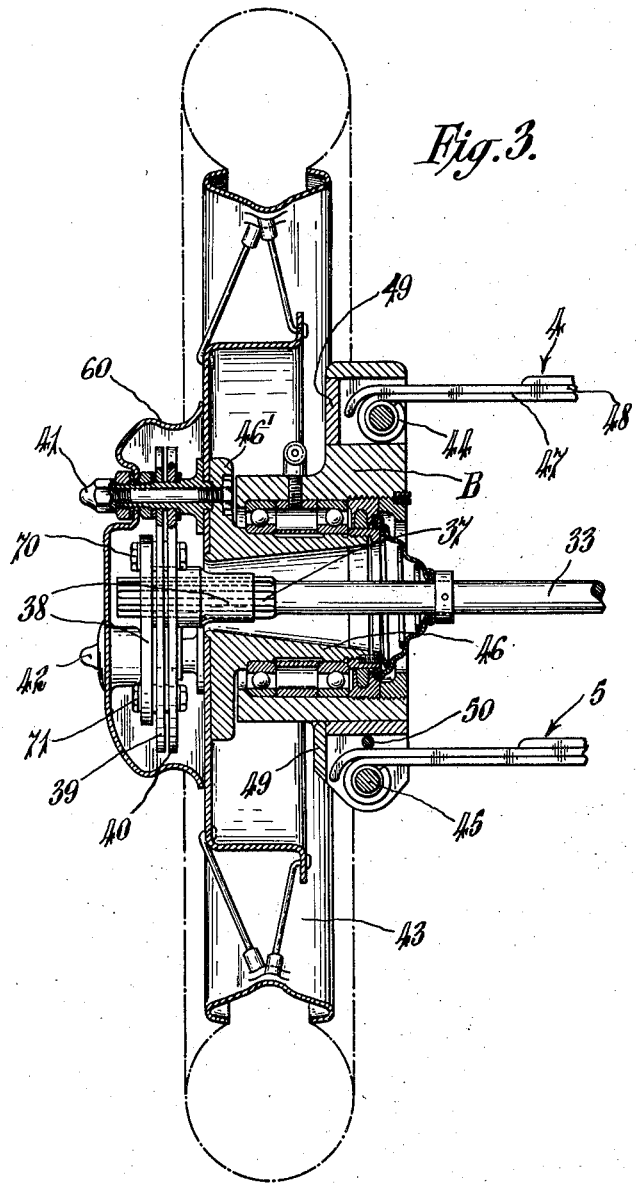

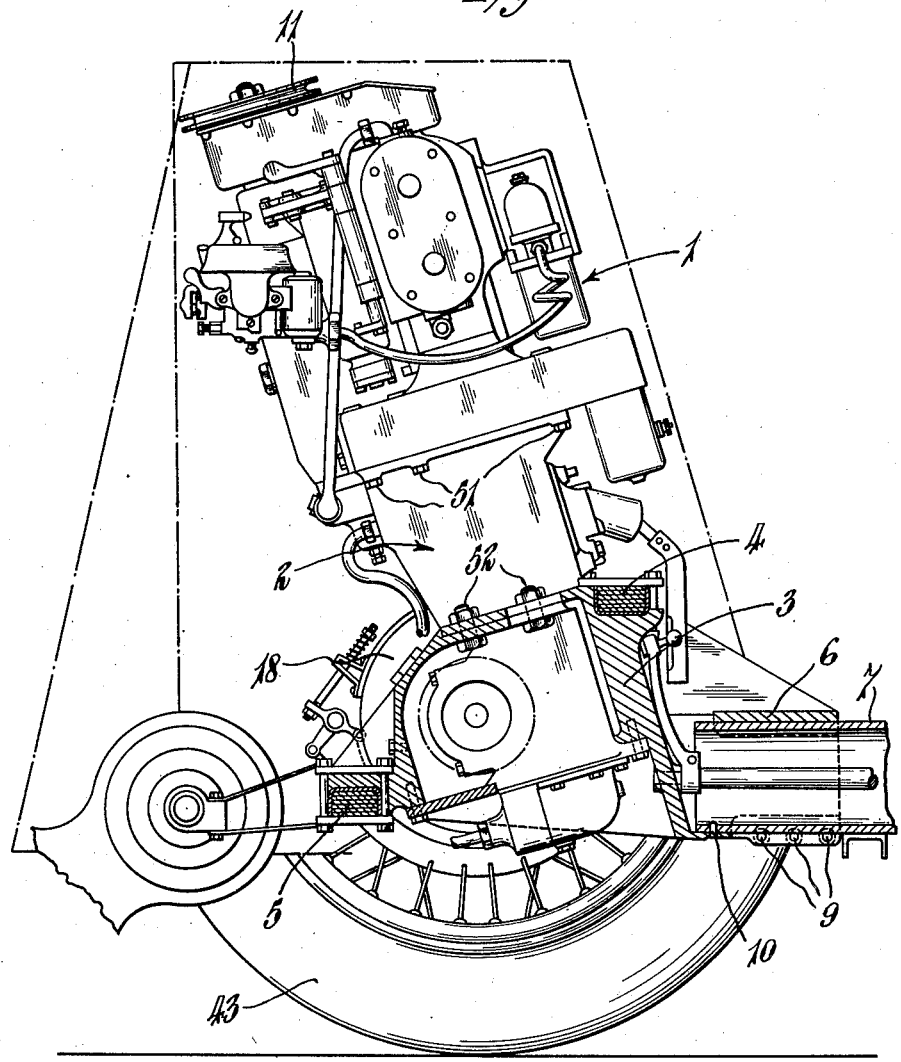

Patented Nov. 27, 1934

1,982,316

UNITED STATES PATENT OFFICE 1,982,316

MOTOR CAR OR LIKE VEHICLE

Donald Gordon Mackenzie, Montreal, Quebec, Canada

Application February 6, 1931, Serial No. 513,832
In Great Britain February 10, 1930

8 Claims. (Cl. 180—54)

The present invention relates to improvements in or relating to motor cars or like vehicles and, while it more particularly concerns cars of the type in which the chassis is supported by the flexible axles and the engine is located at the rear of the car, it should be understood that the invention is capable of broader application as set out in the claims accompanying the specification. Broadly speaking the principal feature of the invention concerns the provision of arrangements by which the various component elements may be readily detached, are rendered easily accessible and may be considered as constituting a unit consisting of motive parts, drive and rear suspension, which should be considered in this case as interdependent.

According to one feature of the invention the engine and all driving parts which are mounted in the immediate proximity of the rear live axles, can be detached from the chassis as a single unit together with the rear road wheels and rear spring suspension and wheeled away for repair or replacement.

Other features of the invention concern arrangements by which the engine can be detached separately from the gear-box or the engine and gear-box can be separated from the differential casing or the differential gear can be removed from within the member which serves as a combined engine bed, spring support and rear support for chassis and differential housing, splines being used where required to facilitate the detachability of a shaft from a part which it normally engages, such as the engine shaft or the live axles of the car.

Other features of the invention concern the provision of a spline joint by which the universal joint between the live axle and the wheel can be located in the hub on the outside of the wheel and can be readily detached when it is required to move or replace a wheel.

A further feature of the invention concerns an arrangement according to which the upper flexible rear axle and the lower flexible rear axle are arranged so that they are on opposite sides as regards the front and rear of the car, of the live axles so as to permit of the differential device being mounted in line with the hub axles. To this end the upper of the two axles may be secured to the upper part of the front of the differential casing whilst the lower flexible axle is secured to the lower part of the rear side of the differential casing. By this arrangement it is possible to mount the differential with its horizontal axis coincident with that of the road wheels it is set to drive. Heretofore to attain this end, three or more springs or arms and/or diagonal torque arms have been used to keep the road wheels in line.

Other features of the invention concern arrangements for protection against accidents or loss of control caused by a broken leaf-spring and a special arrangement of a universal joint at the two ends of the live axles.

These and other features will be better understood by referring to the accompanying drawings which illustrate, by way of example, one arrangement for carrying the invention into effect, although it will be understood that various alterations may be made in the constructional features without departing from the spirit of the invention.

In the drawings,

Fig. 1 shows in side elevation the frame, road wheels and motive units of a car.

Fig. 2 shows a plan view of the rear road wheels, flexible axles forming independent road wheel springing, live axles and engine of a motor car embodying the features of the invention.

Fig. 3 shows a vertical section through the left rear wheel showing the universal joint between the live axle and the wheel and also the side brackets in which the leaf-springs constituting the flexible axle are secured.

Fig. 4 is a sectional elevation of the left half of the differential housing showing also the universal joint between the differential driving spiders and the live axle and the manner in which the differential gear can be freed for removal from its housing.

Fig. 5 is a part sectional side elevation of the rear portion of the car showing the position of the diagonally mounted transverse leaf-springs forming the independent wheel suspension and the manner in which the engine, the gear-box and differential gear can be separately detached.

The general arrangement will be best understood by referring to Figs. 1 and 2, while the details are more clearly illustrated in Figs. 3, 4 and 5.

In Figs. 1 and 2 the rear wheels 43 carry the two flexible axles 4 and 5, of which the upper flexible axle 4 is in front of the lower flexible axle 5. The differential casing 3, as also the gear-box, engine and auxiliary equipment, are carried directly by and above the flexible axles. The differential casing 3 has an extension 6 to which the longitudinal part of the undercarriage, i. e. the underframe 7 is fastened in such a manner that the rear wheels, engine, gear-box and differential gear can be quickly and easily detached as a single unit from the car and wheeled into a garage for repair and overhaul. If desired a spare unit could be used for replacement purposes. The body of the car is attached to the tube 7 by any convenient method. The brake drums 18 are attached to the transmission shafts 19 instead of directly to the wheels. The universal joint between the live axle and the wheel is arranged to lie on the outer side of the rear road wheels, thus lengthening the live axles, reducing the angularity of the drive through the universal joints and consequent loss of driving power.

The invention will be more clearly understood by referring to the description of the other figures.

Referring to Fig. 5, the engine 1 is of the multicylinder type operating on a substantially vertical crankshaft (not shown). The crankshaft is connected to one element of a clutch, the other elements being connected by means of a spline shaft to the gear in the gear-box 2. By reason of the splined shaft the engine and clutch may be readily detached from the gear-box. The gear-box itself may follow any well-known design and is immaterial to the present invention as is also the differential gear contained in the housing 3. The drive from the gear-box to the differential, however, is short and direct, thus eliminating the usual propeller shaft together with its attendant torque tube and universal joint. The housing 3 containing the differential gear comprises a unit to which the leaf-springs 4 and 5, which form the flexible axle from the rear wheel, are secured. These leaf springs are not arranged as is usual when two leaf springs only are employed with one leaf spring vertically over the other, but are staggered so that the upper leaf spring 4 is some distance in front of the lower leaf spring 5 or vice versa. This arrangement gives much greater resistance to torque strains and is in every way superior to existing arrangements, enabling the differential to be set in line with the road wheels and providing the superior wheel alignment heretofore only obtainable by utilizing either a greater number of transverse springs or radius rods. The unit or housing 3 also includes an extension 6 to which a tubular undercarriage or similar central chassis member for supporting the car body may be secured.

In the arrangement shown the tubular undercarriage 7 is secured in a clamp formed in the extension 6 by means of the bolts 9, a dowel pin 10 being provided to ensure that the shaft 7 does not creep in the housing 3 and that the clamp and the shaft 7 are correctly positioned relative to each other.

The relative positions of the auxiliary devices associated with the engine may be readily traced from the figure but as these by themselves do not constitute any feature of the present invention no description is given. 11 represents a pulley which forms part of the engine starting device and enables the engine to be started without the necessity of employing a crank which with an engine having a vertical crankshaft would be inconvenient. The pulley would be manually operated by a rope or cable. 18 represents one of the brake drums which, as will be seen from Fig. 4 are rigidly secured to the transmission shaft 19 leading from the differential gear instead of the usual arrangement in which the brakes are applied directly to the wheels. The advantage of this is that it saves the flexible axles from torque strains due to the application of the brakes. The shaft 19 is splined at one end and passes through the bearing 20 to engage the differential wheel 21. At the other end the shaft 19 is provided with a collar 22 and is tapered at 23 terminating in a threaded portion 24.

The brake drum 18 is secured on the tapered portion 23 of the shaft 19, being keyed thereto by the key 27 and retained by the nut 28 screwing on the threaded portion 24 of the same shaft. The transmission shaft 19 is journalled on ball bearings 29, which bearings are held in position by a threaded member 30 locked in position by a locking screw 31, thus retaining the transmission shaft 19 in position relative to the housing 3. The universal joint consists of two discs 25 and 32, of flexible material, being connected to the brake drum by three equally spaced bolts, while three equally spaced arms forming part of a spider rigidly connected to the live axle 33 are bolted to the flexible discs intermediate to the three aforementioned bolts together with a suitable centering hub. One of the connections of the discs to the brake drum is shown at 34, while two of the three arms of the spider connecting the live axle to the discs are shown at 35 and 36 respectively. It will be understood that universal joints of standard pattern are equally applicable to this arrangement. Each live axle has a splined end.

The rear spring brackets B are each formed with an outwardly extending hub, in which is journalled a flanged member 46. The live axle 33 terminates in a spline 37 which engages in the hub of a three-arm centering member 38 of the universal joint, the three-arms radiating at equal angles to each other and being connected to a pair of flexible discs 39 and 40, similar to the discs 32 and 25 by three bolts, two of which are shown at 70 and 71. Alternatively, universal joints of standard pattern may be used. The discs 39 and 40 are secured by three bolts carrying specially shaped distance pieces to the flange 46' of the member 46. These bolts and distance pieces, of which 41 and 42 are shown, serve also to secure to the flange 46', the hub of the road wheel 43 being arranged approximately midway between the bolts securing the three-arm member 38. The ends of the flexible axles 4 and 5 are secured by shackle bolts 44 and 45 to the spring bracket B. The leaf springs are specially constructed to provide against accidents, as while springs manufactured to-day are very reliable and breakages are comparatively rare, yet it is desirable that in the case of such a breakage occurring the car should not be out of control and provision is made according to one novel feature of the invention for a reserve in case of such breakage happening. This is done as follows: with the upper leaf-spring forming part of the flexible axle the spring is made up of a number of transverse spring leaves as usual. Of these the first, 47, passes right round the shackle bolt 44 in the form of an eye, as shown, while the second spring 48 extends part-way round the shackle bolt on the outside of the spring leaf 47. In order that the design may be better seen in the drawings, it will be noted that a false section has been taken to show the manner in which the spring is secured. The housing for the ends of the spring leaves is provided with an auxiliary wall 49 so located with relation to the leaves 47, 48 and the shackle bolt 44 that, in the event of the master spring leaf 47 breaking, the spring leaf 48 will be held in the housing and the shackle bolt 44, being prevented from passing outwardly therethrough by the wall 49 and further prevented from over-riding the shackle bolt 44 by the roof of the housing. The flexible axle will be loosened but it will not give way absolutely as in the present design of leaf-spring if the main spring leaf, similar to 47, breaks and, consequently it will be possible to retain control of the car and drive it under its own power to a garage or to a convenient place where it can be repaired. The lower shackle housing is constructed somewhat differently due to the springs being above the shackle bolt, although the general principle is the same, this modification being the provision of a pin 50 to prevent the second leaf spring getting free from between the shackle bolt 45 and the pin 50 in the event of the main spring leaf 47 breaking.

An important feature of the invention relates to the detachability of the various parts and a general description will be given as to how these parts may be separated so that the invention may be better understood.

In the first place the invention permits of the rear wheels, including the engine, gear-box and differential gear being detached from the car in a very simple manner. All that is necessary is to release the bolts 9 and remove the pin 10 and release the brake and transmission controls and any electrical conductors which may extend from the engine to the car proper, when the engine with the rear wheels can be removed right away from the body of the car. The manner in which this can be done will be clearly seen from Fig. 4 and of course the arrangement for easy detachability would be equally applicable, if instead of a tubular shaft 7, a rectangular shaft or other body supporting member was secured to the transmission housing and the back axle by a few bolts or their equivalents.

In order that the engine may be removed separately the gear-box casing 2 is machined at its upper end to form an engine bed on which the engine is secured and all that is necessary is to undo the nuts 51 and remove the engine from the bed, the spline joint connection permitting the clutch driving shaft to be disengaged from the gear box assembly to which it is otherwise connected when it is lifted in the direction of the axis of the engine shaft. The gear-box casing in turn is secured by bolts 52 from the inner side of the housing 3 for the differential gear. To remove the differential gear all that is necessary is to undo the nut 28, the locking pin 31 and release the threaded portion 30 and thereby remove the bearings 29 and the shaft 19 from the left-hand side of the casing 3. The arrangement on the right-hand side is similar and a similar operation at that side will be necessary, as will be readily understood. As the live axle 33 has also to be removed to the left for this operation to take place, this can be effected by removing the three nuts such as 41 and 42, by which the wheel can be detached but in this case without removing the wheel, and simply pulling the discs 39 and 40, the spider 38 and live axle 33 outwardly in a body. The differential gear is then free to be released by unscrewing nuts such as 53 and releasing the differential gear from the underneath side.

It will be understood that in referring to the releasing arrangements generally, a description has only been given for the separation of the main mechanical portions but it will be understood that it is equally necessary to remove the controlling portions including the brake and gear control and also the electrical connections. To remove either rear road wheel all that is necessary is to remove bolts such as 41, 42 and remove the universal joint including the elements 38, 39 and 40 together with the wheel 43 from the flange 46' of the hub member 46. It will be readily seen how it is possible to replace a new wheel, bearing in mind that the hub cover 60 surrounding the universal joint is detachable on the road wheel 43, so that all the elements of the universal joint together with the hub cover 60 form a single unit which is separable in a body from the wheel 43 and consequently can be replaced when a new wheel is put into position.

It is believed that it is the first time that a universal joint has been placed on the outside of a wheel instead of between the wheels as has hitherto been the practice. This has the great advantage of reducing the extent of play of the joint and consequently reduces the power losses and wear and tear.

It will be appreciated that the arrangement of motive parts as above described will render possible the use of a unitary circulating oil flow. That is to say, the pump fed lubricating oil circulated around the engine components will also automatically find its way or be led to all other parts of the motive unit of the car.

The invention is not limited to the particular construction described as it will be understood that considerable modification may be made without departing from the spirit of the invention.

I claim:

1. In a motor car or like vehicle, an underframe, leaf springs mounted at the rear end of said underframe, hub brackets secured to the ends of said leaf springs, a flanged member rotatably mounted in each hub member, means for retaining said flanged member in said hub, means for detachably securing the road wheels to said flanged members, a flexible joint carried by said securing means, a slotted hub carried by said flexible joint, and a driving shaft having its outer end splined to detachably engage said slotted hub.

2. A motor car or like vehicle comprising, in combination, an underframe, leaf springs mounted at the rear end of said underframe, hub brackets, shackle bolts to secure the ends of said springs in said brackets, a master leaf of each spring passing round each shackle bolt, a spring leaf superimposed on each master leaf and passing partly round said shackle bolts, means for preventing said superimposed leaf springs from becoming free from the said brackets, means for detachably mounting road wheels to said hub brackets and means for detachably connecting said road wheels to the motive units of the car.

3. In a motor car or like vehicle, an underframe, a rear axle structure, road wheels mounted at the ends of said axle structure, a differential casing supported by and detachably connected to said rear axle structure and containing a differential unit, said differential casing being detachably connected to the underframe and supporting the latter, a transmission gear casing supported by and detachably connected to the differential casing, an engine unit supported by and detachably connected to the gear casing, and driving axles connecting the differential unit with the road wheels.

4. In a motor car or like vehicle, an underframe, a rear axle structure, formed of upper and lower spring members, road wheels mounted at the ends of said axle structure, a differential casing supported by and detachably connected to said rear axle structure and containing a differential unit, said differential casing being detachably connected to the underframe and supporting the latter, and mounted between said spring members, a transmission gear casing supported by and detachably connected to said differential casing, an engine unit supported by and detachably connected to the gear casing and driving axles connecting the differential unit with the road wheels.

5. In a motor car or like vehicle, an underframe, a rear axle structure having resilient upper and lower members, road wheels bearing said structure, a differential casing supported by and detachably connected with said structure and containing a differential unit, and connected to the underframe, a transmission gear casing superimposed on said differential casing and bolted thereto for ready removal and supported by said structure, an engine unit supported by said structure and connected to said transmission gear casing and detachable therefrom, said rear axle structure carried by the wheels being readily detachable from the underframe, and driving axles connecting the differential to the wheels.

6. In a motor car or like vehicle, an underframe, a rear axle structure of the leaf spring type, road wheels mounted at the ends of said axle structure, a differential casing containing a differential unit and mounted intermediately of the rear axle structure and detachably connected therewith and to the underframe, a transmission gear casing containing gears suitably connected to said differential unit and itself detachably secured to the differential casing, an engine unit detachably supported on said transmission casing and having suitable driving connections to the transmission unit, and driving axles flexibly connecting to the differential unit and the road wheels.

7. In a motor car or like vehicle, an underframe, leaf spring axle structures connected at their ends to road wheels and mounted intermediately in seats in a differential casing detachably connected to and supporting the underframe, a differential unit in said differential casing having flexibly connected driving axles to the road wheels, a transmission unit having a casing detachably mounted on the differential casing, and an engine unit having its casing detachably mounted on the transmission casing.

8. In a motor car or like vehicle, an underframe, a rear axle structure comprising leaf springs connected at their ends to road wheels and mounted intermediately in seats in a differential unit having a casing detachably connected to and supporting the underframe, a driving unit supported on said differential casing and axle structure comprising a transmission unit having a casing detachably connected to the differential casing, an engine having a casing detachably connected to the transmission casing, and suitable detachable connections between the engine, the transmission unit and the differential unit, and driving axles flexibly connected to the differential unit and to the road wheels.

DONALD GORDON MACKENZIE.